United States Patent
Hamel et al.

(10) Patent No.: US 8,735,481 B2
(45) Date of Patent: May 27, 2014

(54) SELF-LUBRICATING SURFACE COATING COMPOSITION FOR LOW FRICTION OR SOFT SUBSTRATE APPLICATIONS

(75) Inventors: Gregg Hamel, Plantsville, CT (US); John Cowles, Somers, CT (US); Curtis Matthew Swartley, Surfside, CA (US)

(73) Assignee: Roller Bearing Company of America, Inc., Oxford, CT (US)

( * ) Notice: Subject to any disclaimer, the term of this patent is extended or adjusted under 35 U.S.C. 154(b) by 217 days.

(21) Appl. No.: 13/224,795

(22) Filed: Sep. 2, 2011

(65) Prior Publication Data

US 2012/0058923 A1    Mar. 8, 2012

Related U.S. Application Data

(63) Continuation-in-part of application No. 12/433,926, filed on May 1, 2009, now Pat. No. 8,034,865.

(60) Provisional application No. 61/049,596, filed on May 1, 2008.

(51) Int. Cl.
   *C08K 3/38*     (2006.01)
   *F16C 33/20*    (2006.01)

(52) U.S. Cl.
   USPC ........................................... 524/404; 508/106

(58) Field of Classification Search
   USPC ....................................................... 524/404
   See application file for complete search history.

(56) References Cited

U.S. PATENT DOCUMENTS

| | | | |
|---|---|---|---|
| 3,806,216 A | 4/1974 | Orkin et al. | |
| 3,929,396 A | 12/1975 | Orkin et al. | |
| 3,996,143 A | 12/1976 | Orkin et al. | |
| 4,048,370 A | 9/1977 | Orkin et al. | |
| 4,053,665 A | 10/1977 | Orkin et al. | |
| 4,134,842 A | 1/1979 | Orkin et al. | |
| 4,179,529 A | 12/1979 | Vetter | |
| 4,180,598 A | 12/1979 | Emmons | |
| 4,269,869 A | 5/1981 | Morohashi et al. | |
| 4,453,988 A | 6/1984 | Slater et al. | |
| 4,473,481 A | 9/1984 | Fukutsuka et al. | |
| 4,717,268 A | 1/1988 | Orkin | |
| 4,734,333 A | 3/1988 | Leo et al. | |
| 4,842,424 A | 6/1989 | Narkon et al. | |
| 5,137,374 A | 8/1992 | Orkin | |
| 5,279,864 A | 1/1994 | Ohkita et al. | |
| 5,407,601 A | 4/1995 | Furey et al. | |
| 5,716,911 A | 2/1998 | Furey et al. | |
| 5,792,717 A | 8/1998 | Takayama | |
| 5,860,747 A | 1/1999 | Wan et al. | |
| 6,085,797 A | 7/2000 | Grabaum et al. | |
| 6,090,869 A | 7/2000 | Orkin et al. | |
| 6,180,574 B1 * | 1/2001 | Ryan et al. | 508/106 |
| 6,231,931 B1 | 5/2001 | Blazey et al. | |
| 6,395,822 B1 * | 5/2002 | Edgington | 524/523 |
| 6,432,490 B1 | 8/2002 | Rekowski et al. | |
| 6,723,440 B2 | 4/2004 | Valeri et al. | |
| 6,726,367 B2 | 4/2004 | Yamamoto et al. | |
| 6,852,768 B2 | 2/2005 | Jin et al. | |
| 6,887,520 B1 | 5/2005 | Paver et al. | |
| 7,067,182 B2 | 6/2006 | Li et al. | |
| 7,067,462 B2 | 6/2006 | Krohn | |
| 7,067,565 B2 | 6/2006 | Valeri et al. | |
| 7,528,189 B2 * | 5/2009 | Taylor et al. | 524/397 |
| 2002/0108838 A1 * | 8/2002 | Olson et al. | 198/500 |
| 2004/0138072 A1 | 7/2004 | Levy | |
| 2004/0209784 A1 | 10/2004 | Hardman et al. | |
| 2005/0109990 A1 | 5/2005 | Yeager et al. | |
| 2007/0242912 A1 | 10/2007 | Tanaka et al. | |

FOREIGN PATENT DOCUMENTS

| | | |
|---|---|---|
| JP | 05-186790 | 7/1993 |
| WO | 0190230 A1 | 11/2001 |
| WO | 02051559 A2 | 7/2002 |
| WO | 2006031455 A2 | 3/2006 |
| WO | 2009/135094 A1 | 5/2009 |

OTHER PUBLICATIONS

PCT International Search Report and the Written Opinion of the International Searching Authority dated Jul. 18, 2012; (PCT/US2012/038059).
First Office Action against Japanese Patent Application No. 2011-507670, Mailed Nov. 30, 2012, pp. 1-3.
PCT International Search Report and the Written Opinion of the International Searching Authority dated Aug. 6, 2009 (PCT/US2009/042459).
Extended European Search Report issued in corresponding EP Patent Application No. 12162105.6 issued on Jul. 18, 2012.

* cited by examiner

*Primary Examiner* — Hui Chin
(74) *Attorney, Agent, or Firm* — MKG, LLC

(57) ABSTRACT

A bearing having a surface and a self-lubricating surface coating composition deposited on the surface, wherein the self-lubricating surface coating composition includes a curable acrylate composition having a metallic composition. The metallic composition having a metallic acrylate compound according to Formula I:

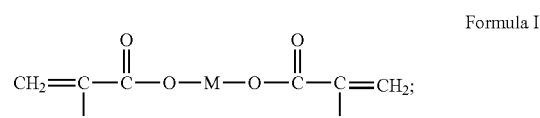

Where $R = H$ or $CH_3$
$M = Zn, Ca$ and
about 30 mass % to about 45 mass % PTFE fiber.

9 Claims, 5 Drawing Sheets

SELF-LUBRICATING SURFACE COATING COMPOSITION FOR LOW FRICTION OR SOFT SUBSTRATE APPLICATIONS

CROSS-REFERENCE TO RELATED APPLICATION

This application is a continuation in part of U.S. patent application Ser. No. 12/433,926, now U.S. Pat. No. 8,034,865, filed May 1, 2009 and which claims priority benefit under 35 U.S.C. §119(e) of U.S. Provisional Patent Application Ser. No. 61/049,596, filed May 1, 2008, which are hereby incorporated by reference in their entirety.

BACKGROUND

1. Field of the Invention

The present application relates to a self-lubricating surface coating composition and more particularly relates to a bearing that includes a surface with the self-lubricating surface coating composition deposited on at least a portion thereof.

2. Description of Related Art

Deterioration through use or stress, often referred to as "wear," occurs to surfaces, often metal, which are in sliding contact with one another. Pressure, high load weight and repetitive motion can accelerate the rate at which wear occurs. When components having surfaces in sliding contact with one another are employed in machinery, wear can lead to various problems that necessitate repair or replacement of the components. In some circumstances, wear experienced by the surfaces may necessitate replacement of the machinery itself.

To reduce the amount of wear and to alleviate the necessity of frequent repair and replacement of components and/or machines, it is known to treat the surfaces of such components with coating compositions. Coating compositions may also be referred to in the art as liner systems, self-lubricating surface coating compositions or lubricants. Known self-lubricating surface coating compositions include, but are not limited to rubber, ceramic, fabric, and resins with lubricant fillers such as polytetrafluoroethylene (PTFE), graphite, and a molybdenum sulfide. Self-lubricating surface coating compositions reduce the amount of wear and friction experienced by a surface that the coating is in contact with, and, as a result, contribute to the longevity and usefulness of the component that defines the surface.

Despite recent improvements in coating composition technology, many self-lubricating surface coating compositions exhibit characteristics such as cracking and fluid absorption susceptibility, which detract from the usefulness of the coating. Many known self-lubricating surface coating compositions are not adaptable for use on all surfaces, such as surfaces on bearings. It has been found that even if a self-lubricating surface coating composition is useful on one bearing configuration or one size bearing, the same self-lubricating surface coating composition may not be useful on different bearing configurations or sizes. Accordingly, a self-lubricating surface coating composition adaptable to many surfaces and having less susceptibility to cracking and fluid absorption, while balancing the amount of wear and friction experienced by the surface and improving overall performance of the surface the coating composition is deposited on, is needed.

SUMMARY

According to aspects illustrated herein, there is provided a bearing including a surface and a self-lubricating surface coating composition deposited on the surface. The self-lubricating surface coating composition includes a curable acrylate composition comprising a metallic composition. The metallic composition includes a metallic acrylate compound according to Formula I:

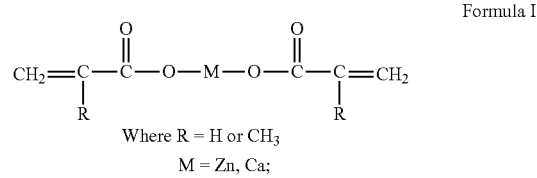

Formula I

Where R = H or CH$_3$
M = Zn, Ca;

and
about 30 mass % to about 45 mass % PTFE fiber.

According to other aspects illustrated herein a method of manufacturing a self-lubricating surface coating composition, includes forming a curable acrylate composition comprising a metallic composition, wherein the metallic composition includes a metallic acrylate compound according to Formula I, above. The method also includes combining a lubricant filler, about 30 mass % to about 45 mass % PTFE fiber and a thixotrope with the curable acrylate composition to form the self-lubricating surface coating composition.

According to other aspects illustrated herein a self-lubricating surface coating composition includes a curable acrylate composition including a metallic composition, comprising a metallic acrylate compound according to Formula I, above. The self-lubricating surface coating composition also includes a lubricant filler such as polytetrafluoroethylene, copper powder, molybdenum disulfide, boron nitride powder, graphite powder or combinations thereof and about 30 mass % to about 45 mass % PTFE fiber. The self-lubricating surface coating composition further includes a thixotrope such as fumed silica, fine polytetrafluoroethylene powder or combinations thereof; and an initiator such as benzoyl peroxide, cumene hydroperoxide, methyl ethyl ketone peroxide, or combinations thereof.

According to other aspects illustrated herein a self-lubricating coating composition includes a curable acrylate composition comprising a metallic composition including zinc monomethacrylate, zinc dimethacrylate and zinc oxide; ethoxylated bisphenol A dimethacrylate; trifunctional acid ester; triethylene glycol dimethacrylate; and ethoxylated trimethylolpropane triacrylate. The self-lubricating coating composition also includes a lubricant filler such as polytetrafluoroethylene, copper powder, molybdenum disulfide, boron nitride powder, graphite powder or combinations thereof and about 30 mass % to about 45 mass % PTFE fiber. The self-lubricating coating composition further includes a thixotrope such as fumed silica, fine polytetrafluoroethylene powder or combinations thereof; and an initiator such as benzoyl peroxide, cumene hydroperoxide, methyl ethyl ketone peroxide, or combinations thereof.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION OF PREFERRED EMBODIMENTS

Figure 1:
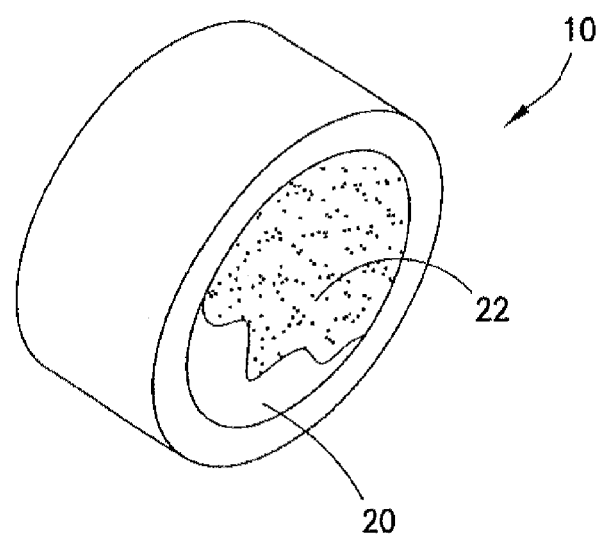
FIG. 1 is a perspective illustration of a plain journal bearing according to one embodiment disclosed herein.
Figure 2:
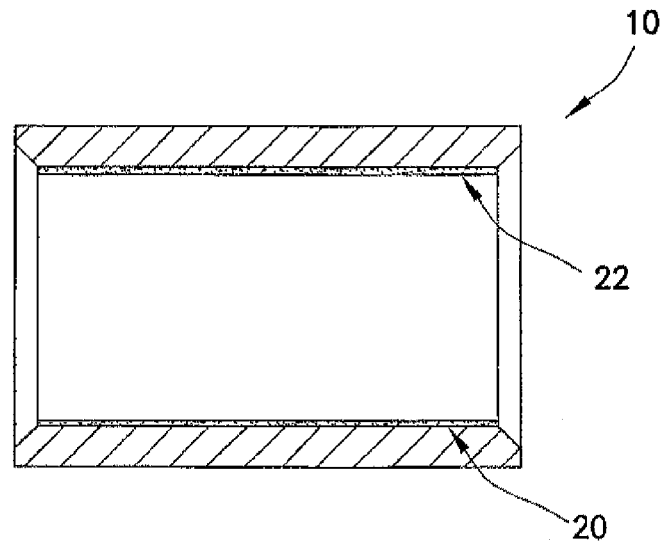
FIG. 2 is a cross-sectional view of a plain journal bearing according to one embodiment disclosed herein.
Figure 3:
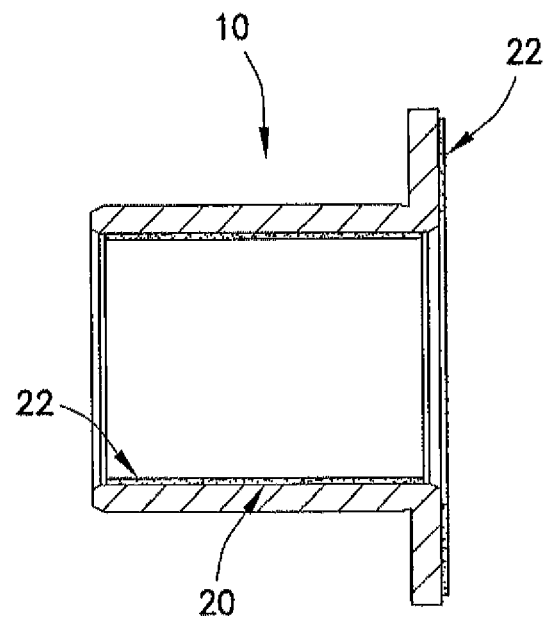
FIG. 3 is a cross-sectional view of a flanged journal bearing according to one embodiment disclosed herein.
Figure 4:
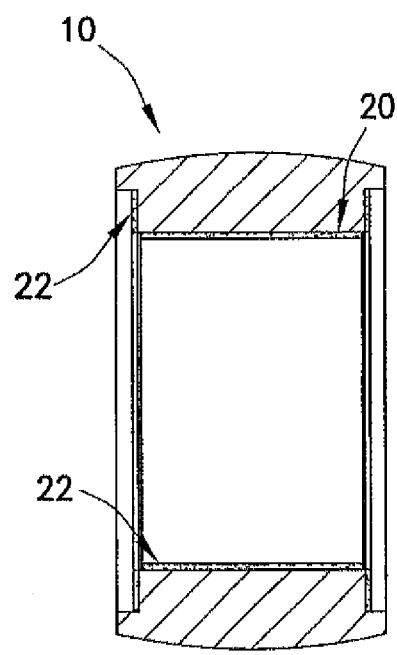
FIG. 4 is a cross-sectional view of an inner ring of a track roller according to one embodiment disclosed herein.
Figure 5:
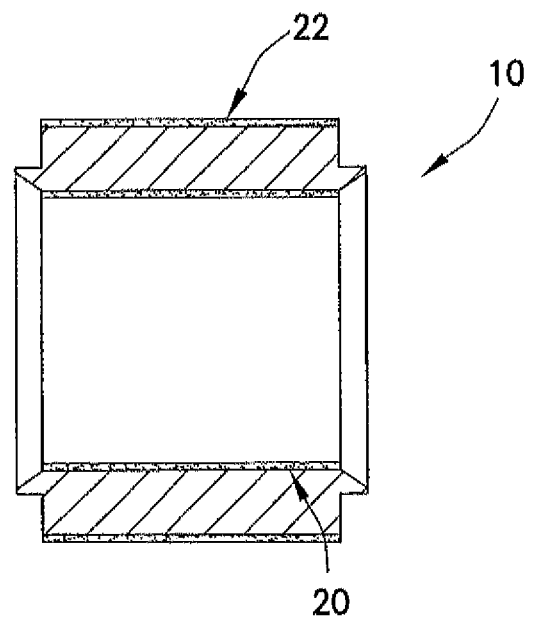
FIG. 5 is a cross-sectional view of an outer ring of a track roller according to one embodiment disclosed herein.
Figure 6:
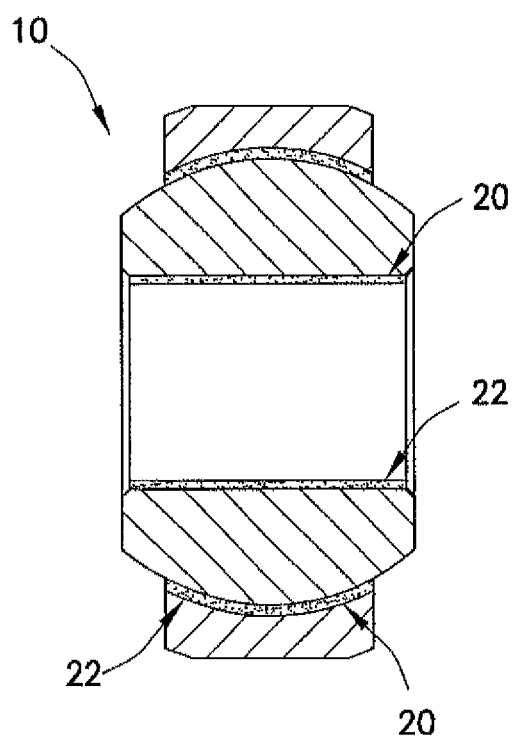
FIG. 6 is a cross-sectional view of a spherical bearing according to one embodiment disclosed herein.

As shown in FIGS. 1-6 a bearing generally designated by the reference number 10 includes at least one surface 20. The surface 20 may be formed from any suitable material, including, but not limited to, titanium, an alloy of titanium, an alloy of tin or lead, aluminum alloys, steel, stainless steel, brass, bronze, cast iron, or a thin layer of silver covered with a thin coating of a soft bearing material. The surface 20 is in movable contact with another surface (not shown), such as, but not limited to, a shaft.

Bearing 10 may be of any type or configuration, including, but not limited to plain journal bearings' (shown in FIGS. 1 and 2), stud type or yoke type track rollers (generally shown in FIGS. 4 and 5), stud type or yoke type cam followers, sleeve bearings, flanged journal bearings (shown in FIG. 3), spherical plain bearings (shown in FIG. 6), ball bearings, bushings, slat bearings, roller bearings, and the like.

At least one surface 20 has a self-lubricating surface coating composition 22 deposited on at least a portion thereof. Prior to deposition of the self-lubricating surface coating composition 22, surface 20 may be treated to achieve a desired surface finish. In one example, surface 20 is subjected to an abrasive blasting, which imposes a desired roughness on the surface. Abrasive blasting can be performed by any acceptable method and with any acceptable media such as grit-blasting, sand-blasting or bead-blasting. In one instance, grit-blasting is performed with 20 grit size aluminum oxide. However, it is contemplated that in other instances, different media and different size media, such as silicon carbide, may be utilized in the abrasive blasting.

After achieving the desired surface finish on surface 20, the surface can be cleaned to remove grease and foreign debris. Any method of cleaning that is effective to remove grease and foreign debris can be employed to clean surface 20. Methods of cleaning include, but are not limited to, alkaline cleaning, emulsion cleaning, solvent cleaning, vapor degreasing, acid cleaning, pickling, salt bath scaling, and the like. After surface 20 is cleaned, the surface may be allowed to dry prior to deposition of self-lubricating surface coating composition 22.

Suitable methods for depositing self-lubricating surface coating composition 22 on surface 20 include, but are not limited to spraying, spinning, dipping, injection and any other method effective for depositing a coating on a surface. Once deposited on surface 20, self-lubricating surface coating composition 22 may be cured by any method effective to cure a coating composition on a surface. Self-lubricating surface coating composition 22 may be subsequently machined to particularly desired measurements.

Self-lubricating surface coating composition 22 is generally a coating that may be used in any application that may benefit from such a coating. Self-lubricating surface coating composition 22 includes a curable acrylate composition having a metallic composition that includes a metallic acrylate compound. In addition to the curable acrylate composition, self-lubricating surface coating composition 22 may also include a lubricant filler, and, depending on the application, other additional components, such as thixotropes and initiators.

The curable acrylate composition utilized in the self-lubricating surface coating composition 22 may contain a variety of compounds, such as one or more curable acrylates and a metallic composition. The type and amount of compounds present in the curable acrylate composition may vary depending on what application self-lubricating surface coating composition 22 will be used for.

In one embodiment, the self-lubricating surface coating composition 22 includes from about 3 mass % to about 55 mass % of the curable acrylate composition, based on the total mass of the self-lubricating surface coating composition. In a specific example, the self-lubricating surface coating composition 22 includes from about 4 mass % to about 55 mass % of the curable acrylate composition, based on the total mass of the self-lubricating surface coating composition. In another example, the self-lubricating coating composition 22 includes from about 5 mass % to about 55 mass % of the curable acrylate composition, based on the total mass of the self-lubricating surface coating composition. In a further example, the self-lubricating coating composition 22 includes from about 10 mass % to about 55 mass % of the curable acrylate composition, based on the total mass of self-lubricating surface coating composition. In a further example, the self-lubricating coating composition 22 includes from about 15 mass % to about 55 mass % of the curable acrylate composition, based on the total mass of self-lubricating surface coating composition. In yet a further example, the self-lubricating coating composition 22 includes from about 20 mass % to about 55 mass % of the curable acrylate composition, based on the total mass of self-lubricating surface coating composition. In another example, the self-lubricating coating composition 22 includes from about 25 mass % to about 55 mass % of the curable acrylate composition, based on the total mass of self-lubricating surface coating composition. In yet a further example, the self-lubricating coating composition 22 includes from about 30 mass % to about 55 mass % of the curable acrylate composition, based on the total mass of self-lubricating surface coating composition. In yet another example, the self-lubricating coating composition 22 includes from about 35 mass % to about 55 mass % of the curable acrylate composition, based on the total mass of self-lubricating surface coating composition. In another example, the self-lubricating coating composition 22 includes from about 40 mass % to about 55 mass % of the curable acrylate composition, based on the total mass of self-lubricating surface coating composition. In another example, the self-lubricating coating composition 22 includes from about 4 mass % to about 35 mass % of the curable acrylate, of the curable acrylate composition, based on the total mass of self-lubricating surface coating composition. In a further example, self-lubricating coating composition 22 includes from about 4 mass % to about 45 mass % of the curable acrylate composition, based on the total mass of self-lubricating surface coating composition. In yet a further example, the self-lubricating coating composition 22 includes from about 4 mass % to about 40 mass % of the curable acrylate composition, based on the total mass of self-lubricating surface coating composition. In yet a further example, self-lubricating coating composition 22 includes for example, from about 4 mass % to about 30 mass % of the curable acrylate composition, based on the total mass of self-lubricating surface coating composition. In a further example, the self-lubricating coating composition 22 includes from about 4 mass % to about 25 mass % of the curable acrylate composition, based on the total mass of self-lubricating surface coating composition. In another example, the self-lubricating coating composition 22 includes from about 4 mass % to about 20 mass % of the curable acrylate composition, based on the total mass of self-lubricating surface coating composition.

The curable acrylate composition may include a metallic composition. The metallic composition may include a metallic acrylate compound. Use of the metallic acrylate compound in the self-lubricating surface coating composition 22 increases adhesion of the self-lubricating surface coating composition to surface 20, compared to prior art self-lubricating surface coating compositions.

Use of any known metallic acrylate compound is envisioned. However, in one specific example, the metallic acrylate has a structure according to Formula I:

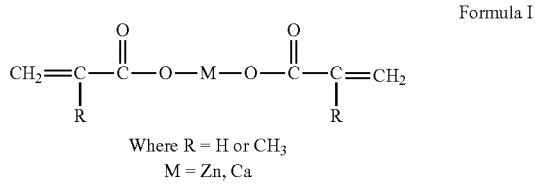

Where R = H or CH$_3$
M = Zn, Ca

The metallic composition in the curable acrylate composition may also include a metallic oxide. Examples of metallic oxides include but are not limited to zinc oxide and calcium oxide.

In one specific example, the metallic composition includes zinc monomethacrylate and zinc dimethacrylate as the metallic acrylate compounds and zinc oxide as the metallic oxide compound. Zinc oxide is commercially available as SR709, sold by the Sartomer Company, Exton, Pa.

The self-lubricating surface coating composition 22 includes from about 3 mass % to about 10 mass % of the metallic composition based on the total mass of the self-lubricating surface coating composition. In another example, the self-lubricating surface coating composition 22 includes from about 4 mass % to about 8 mass % of the metallic composition, based on the total mass of the self-lubricating surface coating composition. In a further example, the self-lubricating surface coating composition 22 includes from about 4 mass % to about 5 mass % of the metallic composition, based on the total mass of the self-lubricating surface coating composition. In yet a further example, the self-lubricating surface coating composition 22 includes 4.54 mass % of the metallic composition, based on the total mass of the self-lubricating surface coating composition.

In addition to the metallic composition, the curable acrylate composition may also include ethoxylated bisphenol A dimethacrylate. The ethoxylated bisphenol A dimethacrylate may be a two (2) mole, four (4) mole, eight (8) mole or ten (10) mole monomer. In one example, four mole ethoxylated bisphenol A dimethacrylate is used and is commercially available as SR540, sold by the Sartomer Company, Exton, Pa.

The self-lubricating coating composition 22 may include from about 10 mass % to about 20 mass % of the ethoxylated bisphenol A dimethacrylate, based on the total mass of the self-lubricating surface coating composition. In a specific example, the self-lubricating surface coating composition 22 includes from about 12 mass % to about 18 mass % of the ethoxylated bisphenol A dimethacrylate, based on the total mass of the self-lubricating surface coating composition. In another example, the self-lubricating surface coating composition 22 includes from about 10 mass % to about 14 mass % of the ethoxylated bisphenol A dimethacrylate, based on the total mass of the self-lubricating surface coating composition. In yet a further example, the self-lubricating surface coating composition 22 includes 13.79 mass % of the ethoxylated bisphenol A dimethacrylate, based on the total mass of the self-lubricating surface coating composition.

The curable acrylate composition present in self-lubricating surface coating composition 22 may further include trifunctional acid ester, which is commercially available as CD9053, sold by the Sartomer Company, Exton, Pa. Generally, self-lubricating surface coating composition 22 includes from about 3 mass % to about 20 mass % of the trifunctional acid ester, based on the total mass of the self-lubricating surface coating composition. In a specific example, self-lubricating surface coating composition 22 includes from about 3 mass % to about 15 mass % of the trifunctional acid ester, based on the total mass of the self-lubricating surface coating composition. In another example, the self-lubricating surface coating composition 22 includes from about 4 mass % to about 10 mass % of the trifunctional acid ester, based on the total mass of the self-lubricating surface coating composition. In yet another example, self-lubricating surface coating composition 22 includes 4.54 mass % of the trifunctional acid ester, based on the total mass of the self-lubricating surface coating composition.

The curable acrylate composition present in the self-lubricating surface coating composition 22 may also include triethylene glycol dimethacrylate, which is commercially available as SR205, sold by the Sartomer Company, Exton, Pa. The self-lubricating surface coating composition 22 may include from about 10 mass % to about 20 mass % of the triethylene glycol dimethacrylate, based on the total mass of the self-lubricating surface coating composition. In one example, the self-lubricating surface coating composition 22 includes from about 12 mass % to about 18 mass % of the triethylene glycol dimethacrylate, based on the total mass of the self-lubricating surface coating composition. In yet another example, the self-lubricating surface coating composition 22 includes from about 10 mass % to about 14 mass % of the triethylene glycol dimethacrylate, based on the total mass of the self-lubricating surface coating composition. In yet a further example, the self-lubricating surface coating composition 22 includes 13.79 mass % of the triethylene glycol dimethacrylate, based on the total mass of the self-lubricating surface coating composition.

Additionally, the curable acrylate composition present in the self-lubricating surface coating composition 22 may include ethoxylated trimethylolpropane triacrylate, which is commercially available as SR454, sold by the Sartomer Company, Exton, Pa. Self-lubricating surface coating composition 22 may include from about 10 mass % to about 20 mass % of the ethoxylated trimethylolpropane triacrylate, based on the total mass of the self-lubricating surface coating composition. In one example, the self-lubricating surface coating composition 22 includes from about 12 mass % to about 18 mass % of the ethoxylated trimethylolpropane triacrylate, based on the total mass of the self-lubricating surface coating composition. In another example, the self-lubricating surface coating composition 22 includes from about 10 mass % to about 14 mass % of the ethoxylated trimethylolpropane triacrylate, based on the total mass of the self-lubricating surface coating composition. In a further example, the self-lubricating surface coating composition 22 includes 13.79 mass % of ethoxylated trimethylolpropane triacrylate, based on the total mass of the self-lubricating surface coating composition.

The self-lubricating surface coating composition 22 may also include a lubricant filler. Lubricant fillers are generally known in the art and include, but are not limited to: polytetrafluoroethylene (PTFE), copper powder, molybdenum disulfide, boron nitride powder, graphite powder and combinations thereof. In one example of the self-lubricating surface coating composition 22, the lubricant filler is polytetrafluoroethylene (PTFE). The PTFE may be treated with compounds containing hydroxyl or carboxylic acid groups, or a sodium naphthalene complex in glycol ether to enhance bonding with the curable acrylate composition.

The PTFE may be used in either flock form, powder form or a combination thereof. PTFE is commercially available in untreated flock form from Toray Fluorofibers America, Decatur, Ala., and is available in surface treated flock form as Aclon® from Acton Technologies, Pittston, Pa. PTFE in powder form is commercially available as UF-8TA, sold by Laurel Products LLC, Elverson, Pa. When a combination of flock and powder form is utilized, the flock to powder mass ratio is between about 3:1 to about 8:1. In one example, the flock to powder mass ratio is 5:1. The mean flock length of the PTFE in flock form is between about 0.008 inches and 0.015 inches.

When utilized, the lubricant filler is added to the self-lubricating surface coating composition 22 in an amount that facilitates low friction properties of the self-lubricating surface coating composition. In one embodiment, the self-lubricating surface coating composition 22 includes at least 20 mass % of the lubricant filler, based on the total mass of the self-lubricating surface coating composition. In one example, the self-lubricating surface coating composition 22 includes from about 20 mass % to about 50 mass % of the lubricant filler, based on the total mass of the self-lubricating surface coating composition. In another example, the self-lubricating surface coating composition 22 includes from about 35 mass % to about 55 mass % of the lubricant filler, based on the total mass of the self-lubricating surface coating composition.

The amount of fillers used in self-lubricating surface coating composition 22 may be modified to increase or decrease the viscosity of the self-lubricating coating composition. The self-lubricating surface coating composition 22 should be thick enough to hold the fillers in suspension, but should also be thin enough to allow easy application to a surface. In general, the total amount of filler in the self-lubricating surface coating composition 22 is at least 40 mass % based on the total mass of the self-lubricating surface coating composition. In one example, the total amount of filler(s) present in the self-lubricating surface coating composition 22 is between 40 mass % and 60 mass % based on the total mass of the self-lubricating surface coating composition.

The viscosity of the self-lubricating surface coating composition 22 may also be altered by the addition of a thixotrope. Thixotropes are chemicals or compounds that increase the viscosity or thickness of a substance while allowing flow to occur under pressure. Thixotropes may aid in the handling of self-lubricating surface coating composition 22. Thixotropes are known in the art and include, but are not limited to fumed silica, fine PTFE powder and combinations thereof. Fumed silica is commercial available as Aerosil® 200, sold by Evonik, Essen, Germany. Fine PTFE powder is commercially available as UF-8TA, sold by Laurel Products LLC, Elverson, Pa. In one example, the self-lubricating surface coating composition 22 includes both fumed silica and fine PTFE powder. When fine PTFE powder is utilized in self-lubricating surface coating composition 22, it may act as both a thixotrope and a lubricant filler.

The amount of thixotropes used in the self-lubricating surface coating composition 22 may vary depending on the viscosity and thixotropic properties of the self-lubricating surface coating composition. The self-lubricating surface coating composition 22 includes between about 0.5 mass % and about 12 mass % of one or more thixotropes, based on the total mass of the self-lubricating surface coating composition. In one example, the self-lubricating surface coating composition 22 includes between about 4 mass % and about 12 mass % of one or more thixotropes, based on the total mass of the self-lubricating surface coating composition. In another example, the self-lubricating surface coating composition 22 includes between about 6 mass % and about 11 mass % of one or more thixotropes, based on the total mass of the self-lubricating surface coating composition.

The self-lubricating surface coating composition 22 may also include an initiator. The initiator adds crosslinking density to the self-lubricating surface coating composition 22 by facilitating a complete cure of the self-lubricating surface coating composition. Initiators are generally known in the art and include, but are not limited to, organic peroxide compositions. Specific examples of initiators include, but are not limited to benzoyl peroxide, cumene hydroperoxide, methyl ethyl ketone peroxide and combinations thereof. In one specific example of the self-lubricating surface coating composition 22, cumene hydroperoxide is used as the initiator, which is commercially available from Sigma Aldrich Corporation, St. Louis, Mo.

The addition of too much initiator can limit the pot life of the self-lubricating surface coating composition 22. However, not enough initiator may lead to an incomplete cure of the self-lubricating surface coating composition 22. Accordingly, the self-lubricating surface coating composition 22 generally contains between about 0.5 mass % and about 3.0 mass % of an initiator based on the total mass of the self-lubricating surface coating composition. In one specific example, the self-lubricating surface coating composition 22 includes between about 1 mass % and about 1.5 mass percent % of an initiator based on the total mass of the self-lubricating surface coating composition.

In one embodiment, the self-lubricating surface coating composition 22 is suitable for use on surfaces which engage (e.g., slidingly engage) a bearing surface having a hardness of less than about Rockwell 50 HRC to about 30 HRC. For example, the self-lubricating surface coating composition 22 can be used on a surface which engages a bearing component (e.g., a shaft, spherical ball or bearing race) manufactured from a titanium alloy having a Rockwell hardness of 34 HRC, such as but not limited to the bearing of Example 3, below. Use of the self-lubricating surface coating composition 22 on surfaces which engage a bearing surface having a hardness of less than Rockwell 50 HRC to about 30 HRC, results in a bearing life (e.g., greater than 400,000 cycles) essentially equal to the life of a bearing having a surface hardness of Rockwell 50 HRC.

In one embodiment, the self-lubricating surface coating composition 22 is suitable for applications which require coefficients of friction substantially less than the coefficients of friction of prior art lubricants. In one embodiment, the self-lubricating surface coating composition 22 has a coefficient of static friction of about 0.01 to about 0.025 at room temperature and a dynamic coefficient of friction of about 0.01 to about 0.14, depending on load, temperature, velocity, surface roughness and cleanliness of the self-lubricating surface.

The self-lubricating surface coating composition 22, includes: about 4 mass % to about 10 mass % Trifunctional Acid Ester; about 4 mass % to about 5 mass % Metallic Arcylate Compound; about 10 mass % to about 14 mass % Triethylene glycol dimethacrylate; about 10 mass % to about 14 mass % Ethoxylated (3) trimethylolpropoane triacrylate; about 10 mass % to about 14 mass % Ethoxylated (4) bisphenol A dimethacrylate; about 0.5 mass % to about 3 mass % cumene hydroperoxide; about 30 mass % to about 45 mass % PTFE Fiber; about 0.5 mass % to about 3 mass % Fumed Silica; and about 5 mass % to about 15 mass % PTFE Powder. This particular composition is best suitable for bearings subject to low or medium loads, for example loads of about 40,000 pounds per square inch or less. In one embodiment, the self-lubricating surface coating composition 22 includes about 35 mass % to about 40 mass % PTFE Fiber. In one embodiment, the self-lubricating surface coating composition 22 includes about 38 mass % to about 39 mass % PTFE Fiber. In one embodiment, the self-lubricating surface coating composition 22 includes essentially no structural fillers such as glass fiber, carbon fiber, microwool fiber and combinations thereof.

Manufacture of the self-lubricating surface coating composition 22 may be done by any method acceptable to manufacture a surface coating composition. In general, the method of manufacturing the self-lubricating surface coating composition 22 may involve combining the various components in the various quantities described above. The components of the self-lubricating surface coating composition 22 may be added, mixed or combined, in any order. However, any initiator utilized in the self-lubricating surface coating composition 22 is added just prior to the self-lubricating surface coating composition being deposited on a surface 20.

The method of manufacturing the self-lubricating surface coating composition 22 may include combining the components that form the curable acrylate composition and then combining the curable acrylate composition with one or more of the lubricant filler(s), and the thixotrope(s). As noted above, combination of the components of the self-lubricating surface coating composition 22 with an initiator may be done just prior to deposition of the self-lubricating surface coating composition on a surface.

In one example, the self-lubricating surface coating composition 22 is manufactured by combining components to form the curable acrylate composition. For instance, the curable acrylate composition is manufactured by combining a metallic composition, which includes a metallic acrylate compound, with one or more of ethoxylated bisphenol A dimethacrylate, trifunctional acid ester, and ethoxylated trimethylolpropane triacrylate.

Additional components of the self-lubricating surface coating composition 22, such as lubricant fillers and thixotropes, are combined with the components of the curable acrylate composition. The components are combined by mixing until uniform. Mixing may be done by any known method or apparatus, including planetary mixers, hand mixing, stirring by a stir rod or stir bar, high shear mixer, or the like.

The lubricant fillers and thixotropes are substantially dry prior to combining them with the curable acrylate composition. To ensure dryness, the fillers and thixotropes may be kept in an oven between one hundred twenty degrees Fahrenheit (120° F.) and one hundred forty degrees Fahrenheit (140° F.) for at least one day prior to use, however any known method or apparatus for drying, such as vacuums and dessicants, may be utilized.

Prior to depositing the self-lubricating surface coating composition 22 on surface 20, an initiator is combined with the mixture of fillers, thixotropes and curable acrylate composition. The mixture is combined until a uniform consistency is reached. The mixture is placed in a mixing vacuum chamber to remove air and decrease voids in the mixture and subsequent final product. The mixture remains in the vacuum chamber until substantially all of the air has been degassed from the composition. The amount of time the mixture remains in the vacuum will vary. For example, the mixture will remain in the vacuum between 5 minutes to 45 minutes. The vacuum is between about 27 and 29 inches of mercury (in Hg).

After mixing the components to manufacture the self-lubricating surface coating composition 22, the composition may be deposited on any surface, such as the surface 20 of bearing 10. As previously mentioned, the surface 20 may be prepared to obtain a desired finish and then cleaned to remove grease and foreign debris. The self-lubricating surface coating composition 22 may be deposited onto a surface by any generally accepted deposition method, including, but not limited to spraying, spinning, dipping, injection and any other methods acceptable for depositing a coating on a surface.

In general, the amount of the self-lubricating surface coating composition 22 deposited on a surface is dependent on the application the surface will be utilized in. The self-lubricating coating composition 22 is deposited on a surface in an amount sufficient to coat the surface to obtain a thickness of at least 0.001 inch, although more or less of the self-lubricating composition may be used if desired.

Once deposited on a surface, such as surface 20, the self-lubricating surface coating composition 22 may be cured. Curing can be accomplished by any acceptable method, including, but not limited to, heat with pressure, heat without pressure, spinning and curing via induction or hot air, and the like. In one example, the self-lubricating surface coating composition is cured by using heat and pressure, where the temperature is about two hundred fifty degrees Fahrenheit (250° F.) and the pressure is greater than 60 PSIG for a time period sufficient to cure the self-lubricating surface coating composition. Cure time varies based on the method used to cure self-lubricating surface coating composition 22 as well as the geometry and shape of bearing 10 which the self-lubricating surface coating composition is deposited on. In one example, when curing is performed with heat and pressure, cure time is between about twenty (20) minutes to about sixty (60) minutes. After curing, the self-lubricating surface coating composition 22 may be machined to precise dimensions.

Non-limiting examples of preparing the self-lubricating surface coating composition and bearing are provided below. Unless otherwise noted, amounts are given in mass percent (mass %) and temperature is given in degrees Fahrenheit (° F.).

EXAMPLES

Example 1

Manufacture of a Self-Lubricating Surface Coating Composition

A self-lubricating surface coating composition is manufactured by forming a curable acrylate composition by combining the components listed in Table 1 in a vessel:

TABLE 1

| Component | Amount (Mass %) |
|---|---|
| Trifunctional Acid Ester[1] | 4.54 |
| Metallic Arcylate Compound[2] | 4.54 |
| Triethylene glycol dimethacrylate[3] | 13.79 |
| Ethoxylated (3) trimethylolpropoane triacrylate[4] | 13.79 |
| Ethoxylated (4) bisphenol A dimethacrylate[5] | 13.79 |

[1]CD9053, sold by the Sartomer Company, Exton, Pennsylvania.
[2]Metallic Diacrylate, commercially available as SR709, sold by the Sartomer Company, Exton, Pennsylvania.
[3]SR205, sold by the Sartomer Company, Exton, Pennsylvania.
[4]SR454, sold by the Sartomer Company, Exton, Pennsylvania.
[5]SR540, sold by the Sartomer Company, Exton, Pennsylvania.

In the same vessel, the curable acrylate composition is combined with the lubricant fillers and thixotropes listed in Table 2.

TABLE 2

| Component | Amount (Mass %) |
|---|---|
| PTFE Fiber[6] | 38.98 |
| Fumed Silica[8] | 1.54 |
| PTFE Powder[9] | 7.70 |

[6]Aclon ®, sold by Acton Technologies, Pittston, Pennsylvania
[7]Microglass ™ 9007D, sold by Fibertec, Inc. of Bridgewater, Massachusetts
[8]Aerosil ® 200, sold by Evonik, Essen, Germany
[9]UF-8TA, sold by Laurel Products LLC, Elverson, Pennsylvania The lubricant fillers and thixotropes should be substantially dry prior to combination with the curable acrylate composition. To ensure dryness of the fillers and thixotropes, lubricant fillers and thixotropes may be kept in an oven at 120° F. to 140° F. for at least twenty-four (24) hours.

The combination of curable acrylate composition, fillers and thixotropes, is combined with 1.33 mass % of cumene hydroperoxide as an initiator to form the self-lubricating surface coating composition. The self-lubricating surface coating composition is placed in a mixing vacuum chamber at between about 27 and 29 in Hg until all the air has been degassed from the composition.

Example 2

Manufacture of a Bearing with a Self-Lubricating Surface Coating Composition

Bearings having at least one surface with a self-lubricating surface coating composition deposited thereon are manufactured by preparing a self-lubricating surface coating composition in accordance with Example 1 and depositing it on a surface of a bearing as follows:

Several flanged bushings of 1" diameter bore are prepared for deposition of the self-lubricating surface coating composition by grit-blasting the surfaces of the bushings with 20 grit size aluminum oxide and then cleaning the surfaces by an alkaline cleaning method. After rinsing the bushings in an alkaline cleaner, the bushings are rinsed with water to remove remaining alkaline cleaner present on the bearing. The bushings are allowed to dry prior to deposition of the self-lubricating surface coating composition.

The self-lubricating surface coating composition of Example 1 is deposited on a surface of the bushings by injection into a mold containing the bushing. The bushings are placed in a cure vessel at 250° F. and at least at a pressure of 60 psi for approximately 30 minutes. The bushings are then placed in an oven at 350° F. for one hour. The coating is then machined to obtain a final thickness of between about 0.008 and 0.009 inches.

Example 3

Several plain bearings with a one inch bore diameter and one half inch length were subjected to an oscillation tests on titanium test shafts having a Rockwell 34 HRC surface hardness. Two of the bearings tested (hereinafter referred to as "test bearing #1 and test bearing #2") had about 0.010 inch thickness of the self-lubricating surface coating composition 22 (e.g., with no structural fillers) deposited on an inside surface of each of the bearings, in accordance with Examples 1 and 2. In addition, two reference bearings (hereinafter referred to as "reference bearing #1 and reference bearing #2"), having a 0.010 inch thick coating meeting the criteria of SAE-AS81934 and containing from about 15 mass percent to about 50 mass percent structural fillers (e.g., glass fiber, carbon fiber, microwool fiber and combinations thereof) incorporated into the surface coating composition, were also subject to the oscillation test on a titanium test shaft having a Rockwell 34 HRC surface hardness. All of the test bearings and reference bearings were tested at a load of 7.2 KSI at 5 Hz while oscillating +/−6.7°. In particular, the test bearings #1 and #2 and the reference bearings #1 and #2 were each pressed into a housing and connected to a hydraulic cylinder coupled to a test rig, for applying load to the respective bearings. One of the titanium tests shafts was placed through each of the test bearings #1 and #2 and the reference bearings #1 and #2 thereby defining an area of engagement between each test shaft and the respective bearing. A support bearing was positioned on opposing ends of each of the shafts with the respective bearing positioned therebetween. The support bearings were mounted in a test rig to rotatably support the shaft for each test. A crank and rocker arm was coupled to the shaft to facilitate oscillation of the shaft relative to the respective bearings being tested.

As shown in Table 3 the test bearings #1 and #2 demonstrated an average coating wear of 0.0004 inches at 400,000 cycles. However, the reference bearing #1 demonstrated an average coating wear of 0.0050 inches at 240,000 cycles and the reference bearing #2 demonstrated an average coating wear of 0.0078 inches at 380,000 cycles.

TABLE 3

| Bearing | Average Wear (inches) of the coating | Cycles |
|---|---|---|
| Test Bearing #1 | 0.0004 | 400,000 |
| Test Bearing #2 | 0.0004 | 400,000 |
| Reference Bearing #1 | 0.0050 | 240,000 |
| Reference Bearing #2 | 0.0078 | 380,000 |

Figure 7:
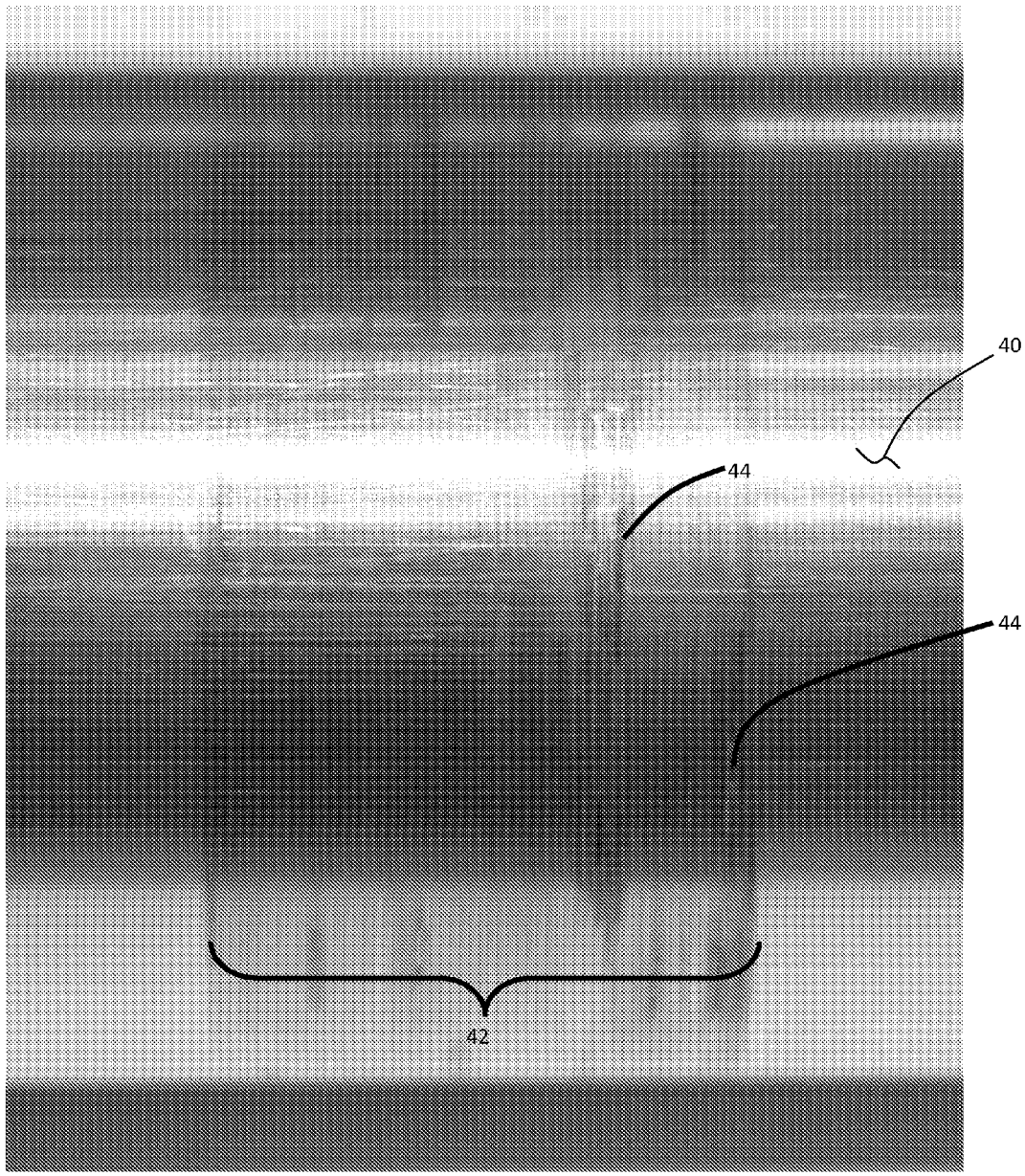
FIG. 7 is a photograph of a portion of a titanium shaft of test bearing #1 of the oscillation tests of Example 3, after 400,000 test cycles.

Referring to FIG. 7 a portion of the titanium test shaft upon which test bearing #1 was tested is designated by the numeral 40 and the area of engagement between the test bearing #1 and the test shaft 40 is designated by the numeral 42. A portion of the test shaft 40 of FIG. 7 is shown after oscillation testing of 400,000 cycles in the test rig. Isolated scoring 44 of less than about 10 percent of the area of engagement 42 was observed after testing.

Figure 8:
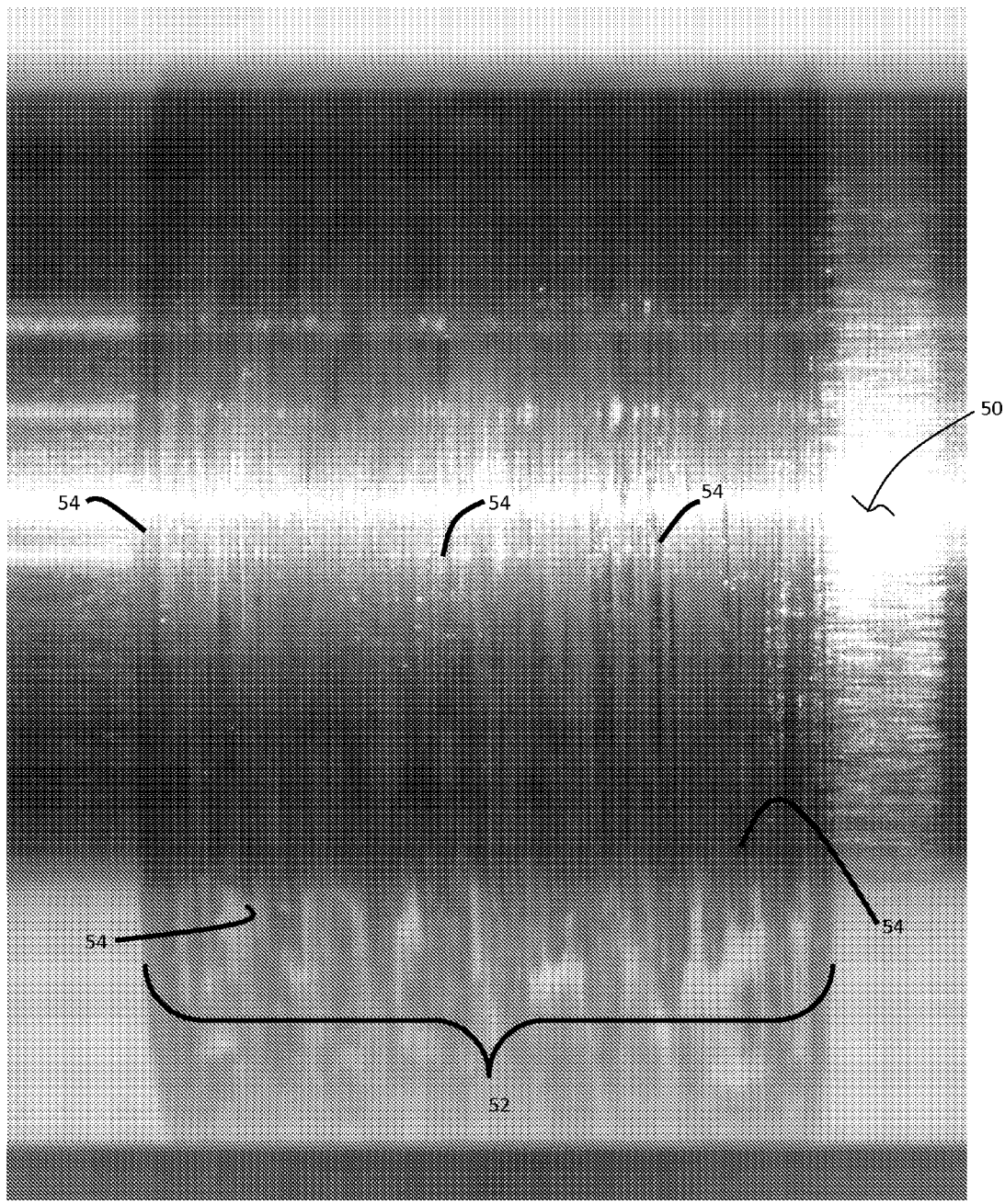
FIG. 8 is a photograph of a portion of a titanium shaft of reference bearing #1 of the oscillation tests of Example 3, after 240,000 test cycles.

Referring to FIG. 8 a portion of the titanium test shaft upon which reference bearing #1 was tested is designated by the numeral 50 and the area of engagement between the reference bearing #1 and the test shaft 50 is designated by the numeral 52. A portion of the test shaft 50 of FIG. 8 is shown after oscillation testing of 240,000 cycles in the test rig. Significant scoring 54 of about 90 percent of the area of engagement 52 was observed after testing.

The test bearings #1 and #2 demonstrated superior performance (e.g., at least 400,000 cycles of operation with 0.0004 inch or less wear to the self-lubricating surface coating composition 22 and 10 percent or less scoring 44 on the area of engagement 42) compared to the reference bearings #1 and #2 (e.g., 0.005 inch wear to the coating at 240,000 cycles, 0.0078 inch wear to the coating at 380,000 cycles and scoring 54 on about 90 percent or more of the engagement area 52). The test results were unexpected because the coating used with the reference bearings #1 and #2 contained a structural filler and the coating used with test bearings #1 and #2 contained no structural filler. One skilled in the relevant art would expect a coating with a structural filler to add stiffness and wear resistance to the coating. In addition one skilled in the relevant art would expect a coating without a structural filler to reduce the stiffness of the coating and allow the coating to extrude out of the area of engagement 42 and reduce the potential for achieving a desirable wear resistant film to transfer onto the shaft from the coating. Moreover, one skilled in the art would have recognized that self lubricating coatings with structural fillers provided acceptable wear performance (i.e., 400,000 cycles or greater with 0.0004 inches or less wear) on shafts having a surface hardness greater than about 50 Rockwell HRC. Thus one skilled in the relevant art would expect such results to translate well to shafts having a surface hardness less than about 50 Rockwell HRC at least because of the presence of the structural filler. However, the above described test results were opposite to that which one skilled in the relevant art would have expected. Thus, the superior test results of the test bearings #1 and #2 were unexpected and were contrary to expectations of those skilled in the relevant art.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of manufacturing a self-lubricating surface coating composition, said method comprising:
    forming a curable acrylate composition comprising a metallic composition, wherein said metallic composition comprises a metallic acrylate compound according to Formula I:

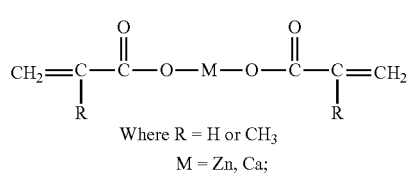

Where R = H or CH₃
M = Zn, Ca;

and
    combining a lubricant filler and a thixotrope, including about 30 mass % to about 45 mass % polytetrafluoroethylene fiber based upon total mass of said self-lubricating surface coating composition, with said curable acrylate composition to form a self-lubricating surface coating composition, wherein said self-lubricating surface coating composition includes essentially no structural fillers such as glass fiber, carbon fiber, microwool fiber and combinations thereof.

2. A self-lubricating surface coating composition comprising:
    a. a curable acrylate composition comprising:
        a metallic composition, comprising a metallic acrylate compound according to Formula I:

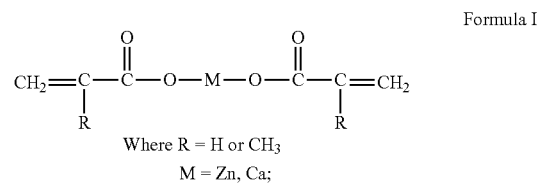

Where R = H or CH₃
M = Zn, Ca;

b. a lubricant filler selected from polytetrafluoroethylene, copper powder, molybdenum disulfide, boron nitride powder, graphite powder or combinations thereof;
    c. about 30 mass % to about 45 mass % polytetrafluoroethylene fiber based upon total mass of said self-lubricating surface coating composition;
    d. a thixotrope selected from fumed silica, fine polytetrafluoroethylene powder or combinations thereof; and
    e. an initiator selected from benzoyl peroxide, cumene hydroperoxide, methyl ethyl ketone peroxide, or combinations thereof;
    wherein said self-lubricating surface coating composition includes essentially no structural fillers such as glass fiber, carbon fiber, microwool fiber and combinations thereof.

3. A self-lubricating surface coating composition according to claim 2, wherein said curable acrylate composition further comprises at least one of ethoxylated bisphenol A dimethacrylate, trifunctional acid ester, triethylene glycol dimethacrylate, ethoxylated trimethylolpropane triacrylate, or combinations thereof.

4. A self-lubricating surface coating composition according to claim 2, wherein said metallic composition further comprises a metallic oxide.

5. A self-lubricating surface coating composition according to claim 4, wherein said metallic oxide is selected from zinc oxide or calcium oxide.

6. A self-lubricating surface coating composition according to claim 5, wherein said metallic composition comprises:
    zinc monomethacrylate;
    zinc dimethacrylate; and
    zinc oxide.

7. A self-lubricating surface coating composition according to claim 2, comprising between about 3 mass % to about 55 mass % of said curable acrylate composition, based on the total mass of said self-lubricating surface coating composition.

8. A self-lubricating surface coating composition according to claim 2 comprising at least 20 mass % of said lubricant filler, based on the total mass of said self-lubricating surface coating composition.

9. The self-lubricating surface coating composition according to claim 2 further comprising between about 0.5 mass % and about 12 mass % of the thixotrope, based on the total mass of said self-lubricating surface coating composition.

\* \* \* \* \*